O. A. HAMRE.
AUTOMOBILE WHEEL.
APPLICATION FILED JULY 26, 1907.
922,278.
Patented May 18, 1909.
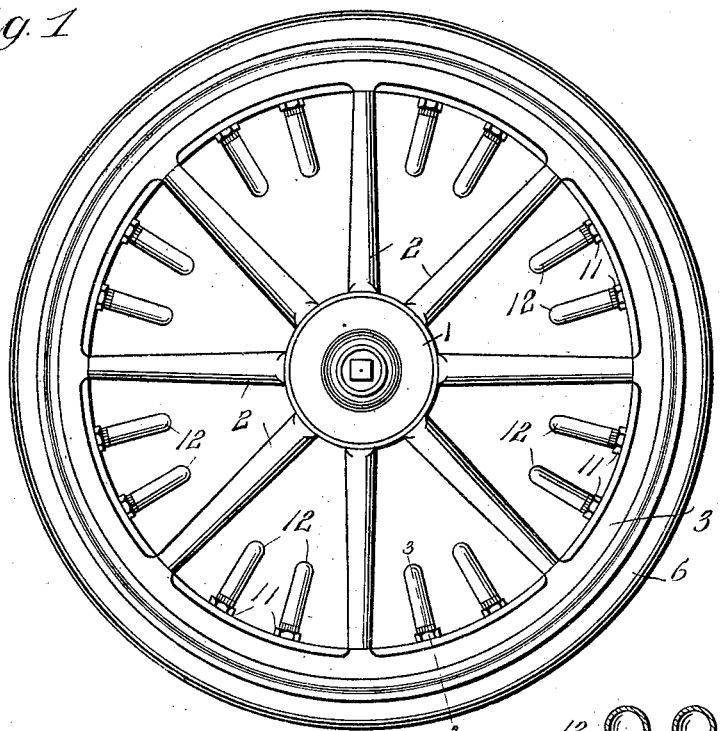
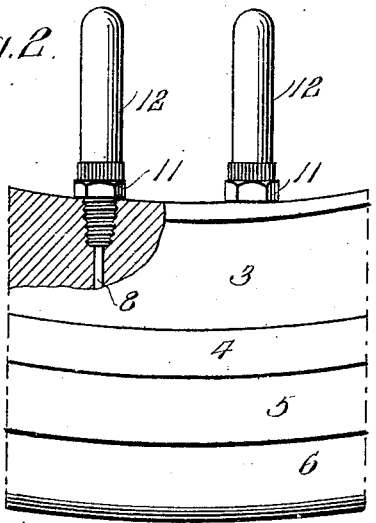
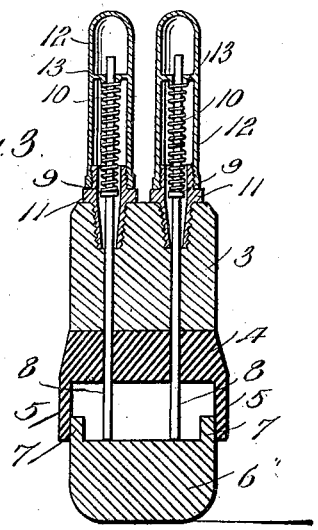
Witnesses
Frank Hough
Inventor
Ole A. Hamre,
By Victor J. Evans
Attorney

UNITED STATES PATENT OFFICE.

OLE A. HAMRE, OF ARRIBA, COLORADO.

AUTOMOBILE-WHEEL.

No. 922,278.  Specification of Letters Patent.  Patented May 18, 1909.

Application filed July 26, 1907. Serial No. 385,698.

*To all whom it may concern:*

Be it known that I, OLE A. HAMRE, a citizen of the United States of America, residing at Arriba, in the county of Lincoln and State of Colorado, have invented new and useful Improvements in Automobile-Wheels, of which the following is a specification.

This invention relates to automobile wheels, and one of the principal objects of the same is to improve the construction of that class of resilient cushioned tire wheels which are practically non-puncturable and which yield to the motions of the vehicle.

Another object of the invention is to improve the construction of cushion-tire automobile wheels in general.

These and other objects may be attained by means of the construction illustrated in the accompanying drawing, in which:—
Figure 1 is a side elevation of an automobile wheel made in accordance with my invention. Fig. 2 is a side elevation and partial section of a portion of the rim of the wheel. Fig. 3 is a sectional view on the line 3—3 of Fig. 1.

Referring to the drawing for a more particular description of my invention, the numeral 1 designates the hub of the wheel, 2 are the spokes and 3 is the rim, these parts being made either of wood or metal and of any required construction to suit the character of vehicles with which the wheel is to be used. Secured to the rim 3 upon the periphery thereof is a rubber annular channel member 4 having side lips or flanges 5. The tread portion 6, which may be of any required cross sectional contour, is provided with upwardly projecting flanges 7 disposed inside the lips or flanges 5. Secured to the tread portion 6 of the tire, at suitable intervals, and in parallel relation are shafts or rods 8, said rods passing through the annular channel member 4 and through the rim 3 and extending between the spokes 2 of the wheel.
The rods 8 are each provided with a collar 9 forming a stop for the encircling springs 10 which surround the rods 8. A nipple 11 is secured in an aperture in the rim 3 said nipple having a threaded outer portion to which a cap 12 is secured said cap having a partition 13 therein through which the upper end of the rod 8 projects. The springs 10 bear at inner ends against the partition 13 as shown more particularly in Fig. 3.
From the foregoing it will be obvious that a tire made in accordance with my invention will yield in passing over obstacles or upon rough roads and that the device is of simple construction and entirely obviates the annoyance of punctured tires. The springs are entirely covered and access may be had to any of the springs by removing the cap 12.

Having thus described the invention, what I claim is:—
A wheel comprising a hub, spokes and a rim, a tire engaged with said rim an annular channel member secured to the rim, said rim and said channel member having alining passages formed therein located between the said spokes, nipples upon the rim in line with the said passages, caps adjustably secured to the nipples, each cap having an apertured partition, rods slidably mounted in the passages formed in the channel member and in the rim, said rods having their outer ends secured to the tire and having their other ends slidably mounted in the apertures formed in the partitions, stop collars secured to the rods, and helical springs coiled about the rods and confined between the collars and between the partitions in the said caps, the said caps being mounted for movement upon the nipples so that the tension of the springs within the caps may be regulated.
In testimony whereof, I affix my signature in presence of two witnesses.

OLE A. HAMRE.

Witnesses:
A. F. RELENDER,
L. O. SJOSTROM.